Patented Oct. 18, 1932

1,883,060

UNITED STATES PATENT OFFICE

GERHARD STEIMMIG, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

LACQUER FOR APPLICATION BY BRUSHING

No Drawing. Application filed July 3, 1928, Serial No. 290,264, and in Germany April 24, 1925.

The present invention relates to new and improved lacquers for application by brushing, which contain collodion cotton. The manufacture of such lacquers has hitherto afforded great difficulties since the usual solvents for such lacquers such as butyl acetate, amyl acetate, cyclohexanone and the like, are either too readily volatile or objectionable in view of their strong and irritating smell. Moreover the said solvents possess the highly objectionable property, when applied to dry cellulose nitrate coatings, to swell or dissolve the same to a considerable extent, whereby the suitability of the lacquers for brushing, their capability of forming smooth surfaces and the time required for drying are unfavourably influenced.

By my present invention I claim to have successfully overcome the said difficulties and to be able to produce good lacquers for application by brushing.

I have found that good lacquers for application by brushing are obtained when starting from collodion cotton which forms solutions of low viscosity and of which at least 15 per cent are soluble in 96 per cent ethyl alcohol, and employing as a solvent a mixture of a low aliphatic alcohol containing one to three carbon atoms in the molecule, or mixtures of several such alcohols, in particular of methyl and ethyl alcohol with an ester of the general formula R—CO—O—$C_nH_{2n}$—OR' (in which R—CO indicates the radical of an aliphatic monocarboxylic acid with from 2 to 4 carbon atoms such as acetic, propionic or butyric acid, R' means an alkyl group with from one to three carbon atoms. and $n$ is 2, 3 or 4). The said solvent mixtures should preferably contain at least 20 per cent of one or more of the said esters. Suitable alcohols are for example ethyl alcohol of 96 per cent strength or anhydrous ethyl alcohol, and also a mixture thereof with methanol or isopropyl alcohol or both.

The lacquers may also contain other solvents or diluents, for example mono- or diethyl ethers of ethylene, propylene or butylene glycol, dialkyl carbonates, dioxane, methyl acetate, ethyl acetate, benzene hydrocarbons, benzine and the like, or mixtures of them.

I may also incorporate with my improved lacquers many natural and artificial resins compatible with the collodion cotton, for example artificial resins obtained by polymerization of vinyl esters. It is most advantageous to employ artificial resins obtained from cyclic ketones, such as cyclohexanone, with or without the aid of phenols and aldehydes. Also plasticizers and drying or non-drying oils may be added to the solutions, and the lacquers may be colored by the addition of suitable coloring matters so as to produce transparent or covering lacquers. It is particularly advisable to employ plasticizers when resins are incorporated with the said solutions of collodion cotton.

It should be noted that such resins as are not completely soluble in the aforesaid mixture of alcohol and ester, can often be completely dissolved by the addition of dioxane or other solvents and thus be used for the production of clear, firmly adhering lacquer coatings.

Suitable proportions for the production of such lacquers are 8 to 20 per cent of collodion cotton, (these percentages being by weight and based on the weight of solvent) 10 to 100 per cent of resin and 0 to 60 per cent of a plasticizer, the proportions of resin and plasticizer being based on the weight of dry collodion cotton present. The solvent employed preferably contains from 20 to 60 per cent of one or more of the esters herein specified, 70 to 40 per cent of ethyl alcohol and 40 to 0 per cent of other constituents.

It will be obvious from the foregoing general explanations that it is possible according to my present invention to vary the properties of the lacquers within very wide limits and to fulfill all requirements of practice, for example as regards the hardness, suppleness, adhesiveness, and lustre of the coatings, the time required for drying and the like.

The following example will further illustrate the nature of my invention which, however, is not limited to this example. The parts are by weight.

*Example*

200 parts of collodion cotton which forms solutions of low viscosity and of which at least 15 per cent are soluble in 96 per cent ethyl alcohol, are dissolved in a mixture of 400 parts of the acetate of ethylene glycol monoethyl ether, 150 parts of isopropyl alcohol, 200 parts of ethyl alcohol and 50 parts of methanol. 50 parts of an artificial resin prepared from cyclohexanone, formaldehyde and phenol and, if desired also 50 parts of tricresyl-phosphate, coloring matters and the like may be added to the solution.

This application is a continuation in part of my application for Patent Ser. No. 103,951, filed April 22nd, 1926.

What I claim is:—

1. A lacquer for application by brushing, comprising collodion cotton of low viscosity and of which at least 15 per cent are soluble in 96 per cent ethyl alcohol, an artificial cyclic ketone resin, and a mixture of at least one low aliphatic alcohol containing from one to three carbon atoms in the molecule with an ester of the general formula $$R.CO—O—C_nH_{2n}—OR'$$

(in which R.CO— indicates the radical of an aliphatic monocarboxylic acid with from 2 to 4 carbon atoms, R' means an alkyl group with from 1 to 3 carbon atoms, and $n$ is 2, 3 or 4).

2. A lacquer for application by brushing, comprising collodion cotton of low viscosity and of which at least 15 per cent are soluble in 96 per cent ethyl alcohol, an artificial resin prepared from cyclohexanone, formaldehyde and phenol, and a mixture of at least one low aliphatic alcohol with an ester containing at least three carbon atoms in the molecule of the general formula $$R.CO—O—C_nH_{2n}—OR'$$

(in which R.CO— indicates the radical of an aliphatic monocarboxylic acid with from 2 to 4 carbon atoms, R' means an alkyl group with from 1 to 3 carbon atoms, and $n$ is 2, 3 or 4).

3. A lacquer for application by brushing, comprising 8 to 20 per cent by weight thereof of collodion cotton of low viscosity and of which at least 15 per cent are soluble in 96 per cent ethyl alcohol and 10 to 100 per cent by weight of the dry collodion cotton of an artificial cyclic ketone resin and 0 to 60 per cent by weight of the dry collodion cotton of a plasticizer and a mixed solvent comprising 70 to 40 per cent of ethyl alcohol, 20 to 60 per cent of an ester of the general formula $$R.CO—O—C_nH_{2n}—OR'$$

(in which R.CO— indicates the radical of an aliphatic monocarboxylic acid with from 2 to 4 carbon atoms, R' means an alkyl group with from 1 to 3 carbon atoms, and $n$ is 2, 3 or 4 and 40 to 0 per cent of other components).

4. A lacquer for application by brushing, comprising 200 parts of collodion cotton of low viscosity and of which at least 15 per cent are soluble in 96 per cent ethyl alcohol, 400 parts of the acetate of ethylene glycol monoethyl ether, 150 parts of isopropyl alcohol, 200 parts of ethyl alcohol and 50 parts of methanol.

5. A lacquer for application by brushing, comprising 200 parts of collodion cotton of low viscosity and of which at least 15 per cent are soluble in 96 per cent ethyl alcohol, 400 parts of the acetate of ethylene glycol monoethyl ether, 150 parts of isopropyl alcohol, 200 parts of ethyl alcohol, 50 parts of methanol, 50 parts of an artificial resin prepared from cyclohexanone, formaldehyde and phenol and 50 parts of tricresyl phosphate.

In testimony whereof I have hereunto set my hand.

GERHARD STEIMMIG.